J. E. DOBSON.
SAFETY LIFE GUARD FOR VEHICLES.
APPLICATION FILED JUNE 6, 1913.
1,145,004.
Patented July 6, 1915.
2 SHEETS—SHEET 2.
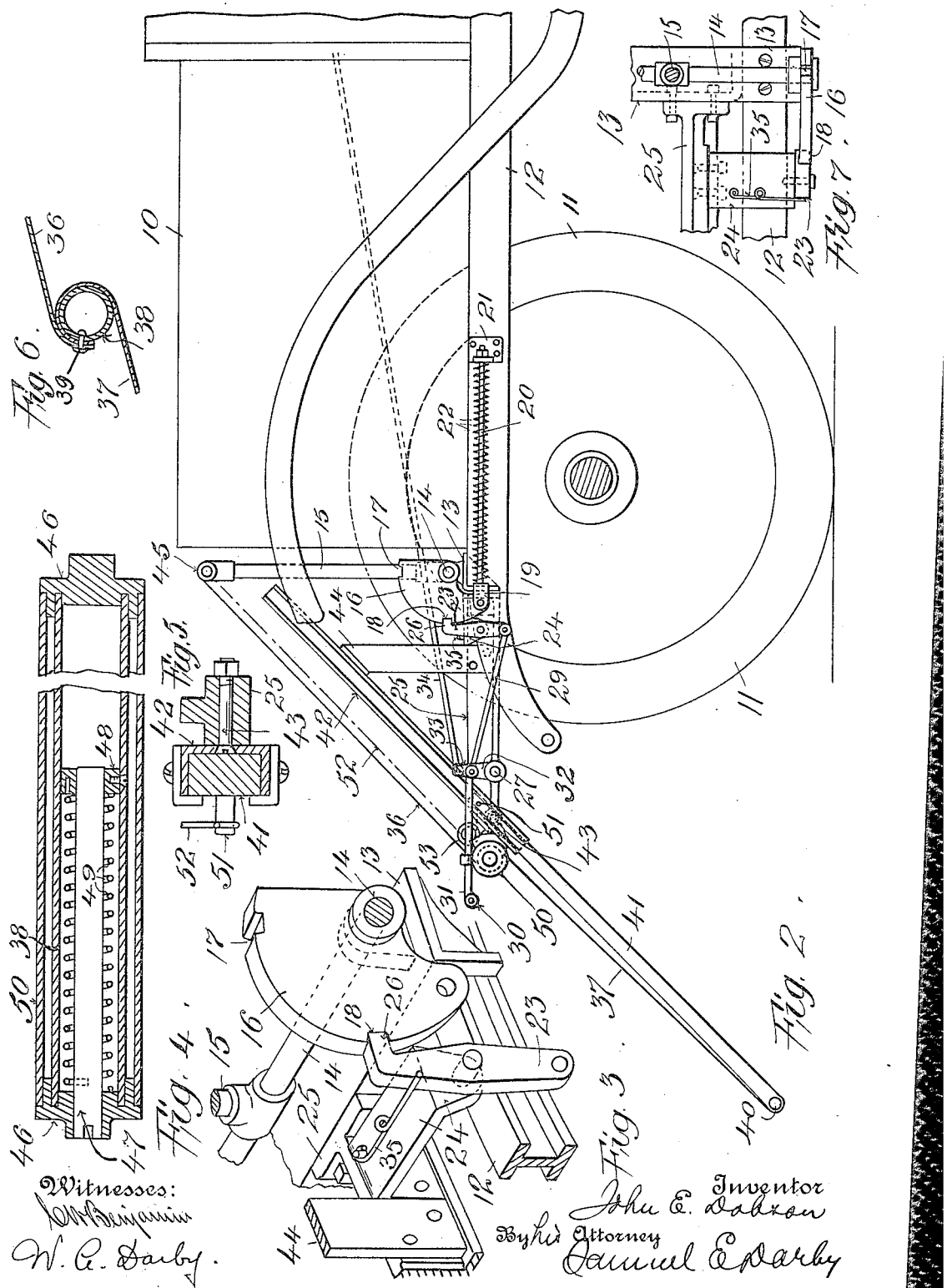

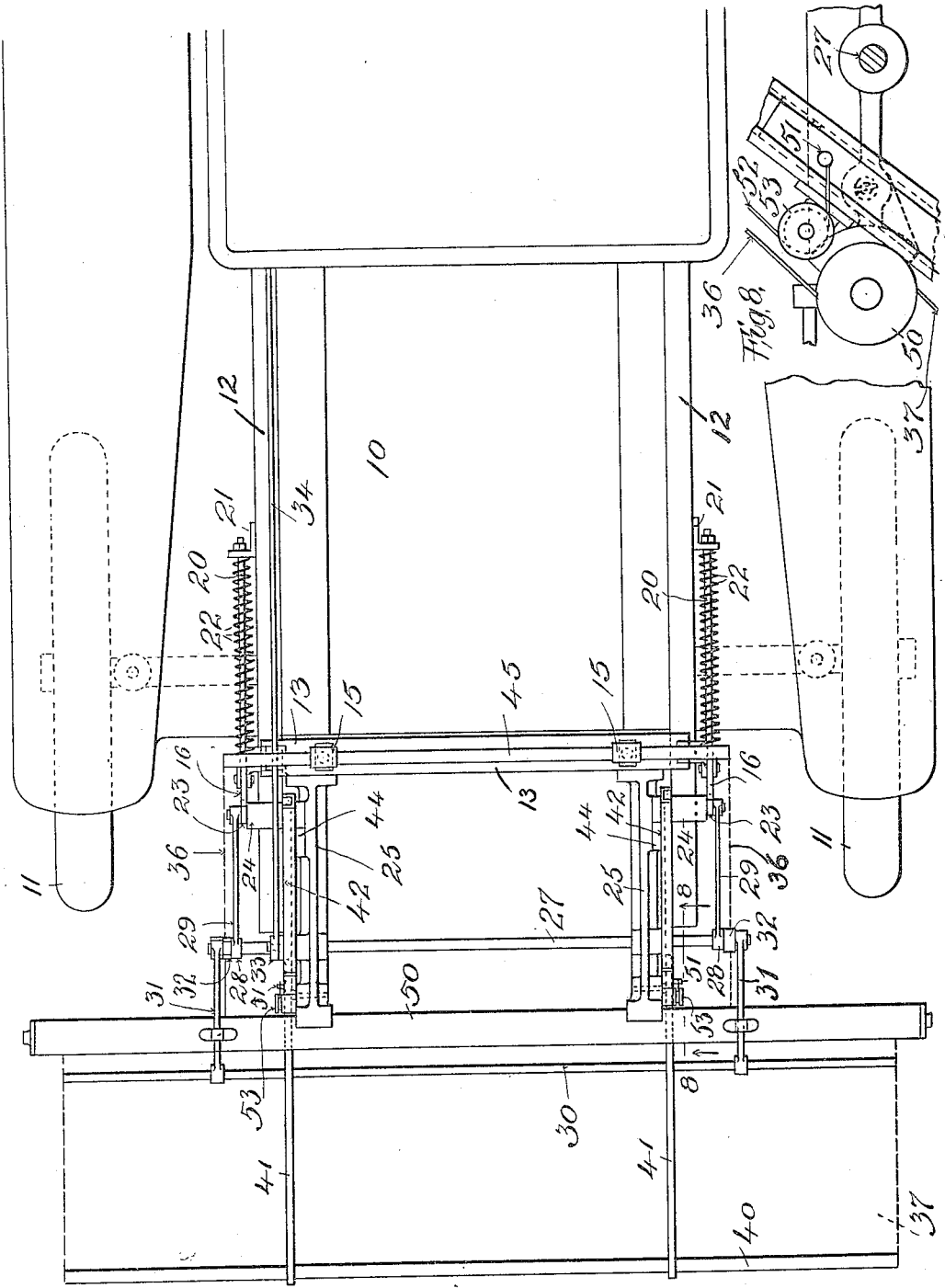

UNITED STATES PATENT OFFICE.

JOHN E. DOBSON, OF NEW YORK, N. Y., ASSIGNOR TO JAMES J. HOEY, OF NEW YORK, N. Y.

SAFETY LIFE-GUARD FOR VEHICLES.

1,145,004.  Specification of Letters Patent.  Patented July 6, 1915.

Application filed June 6, 1913. Serial No. 772,037.

*To all whom it may concern:*

Be it known that I, JOHN E. DOBSON, a citizen of the United States, residing in the city, county, and State of New York, have made a certain new and useful Invention in Safety Life-Guards for Vehicles, of which the following is a specification.

This invention relates to safety life guards for vehicles.

The object of the invention is to provide a safety life guard attachment for automobiles or other vehicles, which is simple in construction, economical to manufacture, easy of application or removal from the vehicle, automatic in action and efficient in operation.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the accompanying drawings, and to the various views and reference signs appearing thereon,—Figure 1 is a top plan view of the front end of an automobile showing the application thereto of a safety guard attachment embodying the principles of my invention, the guard being shown in tripped position for use as a fender or guard and the guard curtains being omitted or indicated by dotted lines. Fig. 2 is a view in side elevation of the same. Fig. 3 is a broken detail view in perspective of a portion of the tripping mechanism. Fig. 4 is a similar view in longitudinal section showing a construction of spring roller for winding or rolling up the guard curtains, the curtains themselves being omitted. Fig. 5 is a detail view in transverse section showing a guide channel for one of lower curtain operating arms. Fig. 6 is a broken detail view in section illustrating the manner of securing the upper and lower curtains to the curtain roller. Fig. 7 is a similar view in top plan of a portion of the tripping mechanism shown in Fig. 3. Fig. 8 is a broken detail view in side elevation showing a portion of the curtain operating devices.

The same part is designated by the same reference numeral wherever it occurs throughout the several views.

The increasing use of automobiles, and particularly in the larger cities where the street traffic is heavy and also increasing makes it exceedingly desirable to employ a safety fender or life guard which, if efficient, will reduce the danger of injury or possible fatal accident by reason of the automobile striking or colliding with a pedestrian.

It is among the special purposes of my present invention to provide an efficient and simple attachment capable of ready and easy application to any desired type, style or make of automobile, or other vehicle, and which in case of collision with a pedestrian or other obstacle in the path of the vehicle, is tripped automatically, or may be tripped manually, and which, when tripped forms a fender or life guard to catch and hold the victim and prevent the vehicle from running over, injuring, or possibly killing such victim.

In carrying out my invention I provide an attachment for application to the front end of the vehicle, and which includes safety fender or life guard curtains so mounted and operated that they are normally held in retracted or rolled up condition ready for use, when tripped, to be projected, the one upwardly and the other downwardly from a common roller on which they are wound, thereby forming a fender or guard to catch and hold the victim of the collision. I also propose to employ means for automatically tripping the curtains but at the same time I provide means whereby the curtain may be tripped manually if necessary, without waiting for the collision impact to effect the tripping operation. The construction, operation, relation and coaction of these and other special features of my invention will now be described in connection with the accompanying drawings in which, for illustrative purposes, I have shown one practical operative embodiment of the principles involved.

In the drawings reference numeral 10 designates the front end of a vehicle, such as an automobile, having the wheels 11 and the usual chassis or side frame members 12. Mounted at its ends upon the side frame members 12 is an angle bar 13, which extends transversely across the front end of the vehicle and which carries the safety guard attachment. By simply bolting or unbolting the transverse bar 13 to or from the chassis side frame members 12, the entire safety guard attachment may be readily applied to or removed from the vehicle. Attached to the transverse bar 13 is a rocking frame comprising a shaft 14, standards 15, segment plates 16, and an ear 19, each member of which will be more fully hereinafter described. In suitable bearings carried by the transverse bar 13 is journaled the rock shaft 14 which extends transversely across the front end of the vehicle, and at each end carries the standard 15, which is connected to rock therewith. Also mounted at each end of rock shaft 14, to rock therewith is the segment plate 16 having notches 17, 18 in the periphery thereof, and which serves as part of a locking mechanism to hold the rock shaft 14 in restrained position of rocking movement. Pivotally connected to a depending heel of the rocking members 16, are ears 19, which are carried by rods 20, mounted to slide in brackets 21 on the side frame members 12, and a compression spring 22 carried by each rod 20, is interposed between the bracket 21 and the ear 19 associated therewith, and normally exerts its tension on segment plate 16 to rock the same, and with it shaft 14 into the position shown in Fig. 2 to carry the standards 15 into vertical position, as shown. By rocking or swinging the standards 15 downwardly into substantially horizontal position, the springs 22 are placed under tension tending to return or restore the standards to vertical position. By holding the segment plate in the position corresponding to the horizontal position of the standards 15, with the springs 22 under tension and providing means for automatically or manually tripping the holding means, I secure the desired elements required for an efficient operation of a safety or life guard apparatus. In the arrangement shown as an embodiment of my invention locking dogs 23 are employed, which are pivotally mounted intermediate their ends upon an auxiliary bracket 24 carried by the main bracket 25 of the attachment frame, the latter being bolted to the transverse bar 13. The dog 23 at one end is provided with a hook portion 26, adapted to engage in the notches 18, 17, of the segment plate 16, to lock the same in the limits of rocking movement thereof. When the locking dog engages in notch 17 the standards 15 are held under restraint in their substantially horizontal position against the tension of springs 22, and when the dog engages in the notch 18 the standards are locked in their vertical positions. In suitable bearings carried by the main brackets 25 is journaled a transverse rock shaft 27 carrying crank arms 28, which are connected by rods 29 to the lower ends of the locking trip dogs 23, whereby, when said shaft 27 is rocked the locking dogs are disengaged from locking engagement with the segment plate notches 17, 18.

A bumper rod 30 extends transversely across and in front of the vehicle and in front of the safety guard attachment, and is carried by arms 31, which are connected to crank arms 32 on the rock shaft 27 whereby, when said bumper rod comes in contact with an obstacle, as, for instance, in case of collision with a pedestrian, said bar yields thereby causing shaft 27 to rock, thereby tripping the lock dogs 23, which permits the spring 22 to become effective to swing the standards 15 into their vertical position. If desired and in order to provide means to effect a tripping of the dogs manually, the shaft 27 is provided with a crank arm 33 to which is connected a rod 34 which extends rearwardly into the body of the vehicle in convenient position to be operated by the driver or other occupant of the vehicle. The locking trip dogs 23 may be yieldingly pressed into engaging relation with respect to the segment plates 16 in any suitable or convenient manner. I have shown a simple arrangement for this purpose where a spring 35 is employed to accomplish the object desired.

The safety or life guard curtains are indicated at 36, 37. These curtains are rolled in the same direction upon the same curtain roller 38, the ends of said curtains being riveted or otherwise secured together to the roller 38, as indicated at 39, Fig. 6, the curtains leading from said roller in opposite directions. The curtain 36 forming the upper curtain leads upwardly and rearwardly from the roller 38 and is attached at its free end to a bar or rod 45 carried in the ends of the standards 15. Similarly the free end of the lower curtain 37 leads downwardly and forwardly from roller 38 and is secured to a rod or bar 40, carried in the lower ends of side bars 41. These side bars slide longitudinally in channel guides 42, which are bolted at their lower ends to the main attachment frame brackets 25, as indicated at 43, Fig. 5, and their upper rearwardly extending ends are carried by standards 44, bolted to the brackets 25. If desired, and in order to secure a desirable flexibility of the attachment to prevent injury in case a person is thrown heavily onto the fender or guard, the standards 44, which support the channel guides 42, may be made of spring material which permits the same to yield. The roller 38, on which the curtains are wound and which is of the spring curtain roller type, is provided with any suitable arrangement of tension spring which tends constantly to turn said roller in a direction to roll the curtains thereon. A simple arrangement is shown in Fig. 4, wherein the roller 38 is journaled at its ends in fixed heads 46 in one of which is rigidly mounted a rod 47 extending longitudinally into the bore of the roller. Since the construction is the same at each end of the roller a description of one will answer for both. On the rod 47 is loosely mounted a collar 48, which is fastened to the roller 38. A spiral spring 49 is wound on the rod 47 and is secured at one end to the collar 48 and at the other end to rod 47. With this arrangement it will be seen that when the curtains are unrolled from the roller 38 it is against the action of the springs 49, the tension of which is constantly exerted in a direction to wind up the curtains on the roller 38. The roller 38 and its spring mechanism are inclosed in a casing 50 which is slotted for the curtains to pass out. The casing 50 is carried by the front ends of the main attachment brackets 25. The side bars 41 are provided with pins 51 to which is secured a cord or other flexible connection 52 which leads downwardly and around guide rollers 53 and thence to the rod 45, carried in the ends of standards 15. The operation of this part of the attachment is very simple. As the standards 15 are rocked downwardly into their substantially horizontal position the springs 49 in the roller 38, cause the curtains to be rolled up on the roller. As the lower curtain is rolled up on the roller 38 the side bars 41 are moved longitudinally upwardly in the inclined channel guides 42. The engagement of the locking dogs 23 in notches 17 of the segment plates 16, lock the curtains and the entire apparatus compactly in their retracted positions ready to be tripped for use. In case of a collision in which the bumper rod 30 is struck, or in case of the operation of the rod 34 manually, the locking dogs 23 are tripped out of engagement with the segment plate notches 17, and thereupon the compression springs 22, become effective to quickly swing the standards 15 into vertical position. This not only causes the upper curtain 36 to be unrolled from roller 38 but through the cord 52 the side bars 41, are projected downwardly and forwardly thereby projecting the lower curtain 37 into fender or life guard position. Thus while the lower curtain is projected downwardly and forwardly the upper curtain is drawn upwardly and rearwardly, thereby forming a life guard fender to catch and hold the victim of the collision.

Having now set forth the object and nature of my invention and a construction embodying the principles thereof, what I claim as new and useful and of my own invention and desire to secure by Letters Patent is:—

1. In a life guard attachment for vehicles, an upper curtain and a lower curtain mounted at the front end of a vehicle, and means for simultaneously projecting said curtains, the one downwardly and forwardly and the other upwardly and rearwardly.

2. In a life guard attachment for vehicles, a curtain roller mounted upon a vehicle, upper and lower curtains rolled upon said roller and means for simultaneously projecting said curtains in opposite directions.

3. In a life guard attachment for vehicles, a spring operated roller mounted upon a vehicle, curtains rolled upon said roller in the same direction, and means for simultaneously projecting said curtains in opposite directions from said roller.

4. In a life guard attachment for vehicles, a roller mounted upon a vehicle, curtains attached at one end to said roller, spring actuated devices tending normally to roll said curtains upon said roller, and means connected to the other ends of said curtains for simultaneously unwinding them from the roller.

5. In a life guard attachment for vehicles, a roller mounted upon a vehicle, curtains attached at one end to said roller and leading therefrom in opposite directions, spring actuated devices normally tending to turn said roller to wind the curtains thereon, and means connected to the other ends of said curtains to simultaneously unwind the same from the roller.

6. In a life guard attachment for vehicles, a roller, a casing therefor, curtains attached at one end to said roller and leading therefrom in opposite directions through the casing, spring actuated devices normally tending to turn said roller to wind the curtains thereon, and means connected to the other ends of said curtains to unwind the same from the roller.

7. In a life guard attachment for vehicles, a roller, spring operated devices to restrain said roller from rotation, curtains wound on said roller in the same direction and leading in opposite directions therefrom, a rocking frame connected to the end of one of said curtains, means for rocking said frame to unwind said curtain from the roller, and means operated by the rocking movement of said frame for unwinding the other curtain from the roller.

8. In a life guard attachment for vehicles, a spring operated roller, curtains wound thereon and leading in opposite directions therefrom, a rocking frame connected to the end of one of said curtains, means for rocking said frame to unwind the curtain from the roller against the action of the spring, and connections between said frame and the other curtain to project said other curtain.

9. In a life guard attachment for vehicles, a spring operated roller, curtains wound thereon, and leading in opposite directions therefrom, a rocking frame connected to one of said curtains, means normally operating to move said frame to unwind said curtain from the roller, a mechanism for restraining said rocking frame, means for tripping said restraining means, and connections between said rocking frame and the other of said curtains whereby when said frame is released both curtains are projected.

10. In a life guard attachment for vehicles, a supporting member to be attached to the frame of the vehicles, brackets carried by the supporting member, a spring operated roller carried by said brackets, curtains carried upon said roller for projection in opposite directions therefrom, and means for projecting said curtains simultaneously.

11. In a life guard attachment for vehicles, a frame including a supporting member for attachment to the vehicle, a spring operated roller carried by said frame, oppositely leading curtains rolled upon said roller, a rocking frame journaled upon said supporting frame, connections between said rocking frame and curtains for simultaneously projecting the latter when said frame is rocked, means for locking said rocking frame under restraint in retracted position, and means for automatically tripping said locking means.

12. In a life guard attachment for vehicles, a supporting frame arranged for attachment to a vehicle, a spring operated roller carried thereby, oppositely leading curtains rolled upon said roller, a rocking frame journaled upon said supporting frame, connections between said rocking frame and said curtains to project the latter in opposite directions when said frame is rocked, a locking member to hold said rocking frame in restraint, and means for tripping said locking member.

13. In a life guard attachment for vehicles, a supporting frame, a spring operated roller, curtains rolled thereon, a rocking frame, connections between said rocking frame and curtains to move said curtains in opposite directions from the roller, a segment member connected to the rocking frame, a spring acting thereon, a locking dog to hold said member in restraint, and means for tripping said locking dog.

14. In a life guard attachment for vehicles, a supporting frame, a spring operated roller, a curtain rolled thereon, side bars connected to the free end of said curtain, channel guides for said side bars, tension devices to move said side bars to project said curtain, a locking dog to restrain said tension devices, and means for tripping said dog.

15. In a life guard attachment for vehicles, a spring operated roller, curtains rolled thereon and leading in opposite directions therefrom, a rocking frame connected to one of said curtains, side bars connected to the other of said curtains, guides for said side bars, cords connecting said rocking frame and side bars to project the latter when the former is rocked, a locking dog to restrain said rocking frame under tension, and means for tripping said dog.

16. In a life guard attachment for vehicles, a spring operated roller, curtains rolled thereon and leading in opposite directions therefrom, a rocking frame including spring pressed segments, locking dogs for said segments, one of said curtains being connected to said rocking frame, side bars connected to the other of said curtains, guides for said bars, cords connecting said bars and rocking frame, and means for tripping said locking dogs.

In testimony whereof I have hereunto set my hand in the presence of the subscribing witnesses, on this 3rd day of June, A. D. 1913.

JOHN E. DOBSON.

Witnesses:
G. A. McGrath,
W. A. Darby.

Copies of this patent may be obtained for five cents each, by addressing the "Commissioner of Patents, Washington, D. C."